United States Patent [19]

Motomura et al.

[11] Patent Number: 5,215,612

[45] Date of Patent: Jun. 1, 1993

[54] METHOD FOR MANUFACTURING TIRES

[75] Inventors: Kenichi Motomura, Amagi; Yoshimasa Imai; Kichinosuke Nishimoto, both of Kodaira, all of Japan

[73] Assignee: Bridgestone Corporation, Tokyo, Japan

[21] Appl. No.: 570,654

[22] Filed: Aug. 21, 1990

[30] Foreign Application Priority Data

Sep. 18, 1989 [JP] Japan .................................. 1-239913

[51] Int. Cl.$^5$ .............................................. B29D 30/30
[52] U.S. Cl. .................................. 156/130.7; 156/121; 156/110.1
[58] Field of Search ...................... 156/110.1, 118, 121, 156/123, 124, 128.1, 126, 130, 130.7, 133, 134, 397, 405.1, 406.2, 127, 135, 129, 401; 152/532, 555

[56] References Cited

U.S. PATENT DOCUMENTS

| | | | |
|---|---|---|---|
| 1,220,178 | 3/1917 | Brucker | 156/130.3 |
| 3,469,614 | 9/1969 | Kobayashi | 152/532 |
| 4,007,069 | 2/1977 | Takayanagi et al. | 156/133 |
| 4,062,393 | 12/1977 | Bertrand | 152/532 |
| 4,273,177 | 6/1981 | Nybakken | 152/532 |
| 4,962,802 | 10/1990 | Rohde | 152/532 |

FOREIGN PATENT DOCUMENTS

| | | | |
|---|---|---|---|
| 0116630 | 7/1982 | Japan | 156/133 |
| 59-124408 | 7/1984 | Japan | |
| 1218194 | 1/1971 | United Kingdom | 156/133 |

Primary Examiner—Michael W. Ball
Assistant Examiner—Francis J. Lorin
Attorney, Agent, or Firm—Sughrue, Mion, Zinn, Macpeak & Seas

[57] ABSTRACT

A method for forming a green tire by assembling tire constituent elements such as a carcass ply, side tread, a belt, a top tread, cushion rubber members and the like. This method comprises the steps of presetting cushion rubber members preliminarily severed into a plurality of pieces at least at the both side portions of the belt and at predetermined positions on the carcass ply respectively, folding back the both side portions of the carcass ply wrapped around a forming drum as well as the side treads respectively superposed on the both side portions to simultaneously shape these into a predetermined shape on the forming drum, and sticking a BT-band consisting of the belt and the top tread preset integrally to a predetermined position. According to this method, always tires having stable quality can be manufactured, and tire production efficiency is enhanced.

3 Claims, 5 Drawing Sheets

METHOD FOR MANUFACTURING TIRES

BACKGROUND OF THE INVENTION

1. Field of the Invention

The present invention relates to a method for manufacturing tires, and more particularly to a process of assembling constituent elements of a motorcar tire.

2. Description of the Prior Art

A radial tire 01 manufactured through a method in the prior art is shown in cross-section in FIG. 7. A carcass ply 02 lined with an inner liner which forms an inner surface of a tire is subjected to shaping into a toroidal form. Both side portions of the carcass ply 02 are covered by side walls 03, and a crown portion is surrounded by a BT-band 06 consisting of a belt 04 and a top tread 05. In a shoulder portion extending from the side portion to the crown portion is embedded a cushion rubber member 07.

Next, brief description will be made on one example of heretofore known methods for manufacturing such radial tires 01 (Official Gazette of Laid-Open Japanese Patent Specification No. 59-124408 (1984)) with reference to FIG. 8 through FIG. 11.

First, the carcass ply 02 is applied onto a first drum 010 as extended from the drum to the both sides, it is folded a little to portions corresponding to the drum ends along the edges of the drum. Beads 08 are then inserted into the folded portions (See FIG. 8).

The extended portions on the respective sides of the carcass ply 02 are folded back so as to wrap around these beads 08, and side walls 03 are applied as covering the folded-back portions to form a base green case (See FIG. 9). It is to be noted that at the end portions of the side walls 03 are preset cushion rubber members 07.

Thereafter, the base green case is extracted by reducing the outer diameter of the first drum 010 and is placed on a second drum assembly 011 as shown in FIG. 10. The second drum assembly 011 is composed of a pair of left and right drum bodies opposed to each other along their axial direction.

The BT-band 06 is preliminarily formed by sequentially wrapping first to third (or more) belts around a BT-drum as superposed on one another and further sticking a top tread 05 thereto in superposition. The thus formed BT-band 06 is extracted from the BT-drum by reducing the outer diameter of the BT-drum, and is positioned concentrically with the outer circumference of the base green case set on the above-mentioned second drum assembly 011.

Subsequently, the left and right drum bodies of the second drum assembly 011 are made to approach each other and air is made to flow into the space between the two drum bodies. Then the central portion of the carcass ply 02 will expand outwards (See FIG. 10), and eventually the carcass ply 02 would deform into a toroidal shape and also would join with the BT-band 06 (See FIG. 11).

In this way a green tire is manufactured, subsequently is loaded in a tire vulcanizing machine and hardened, and thereby a radial tire 01 as shown is FIG. 1 is obtained.

However, since expansion of the base green case shown in FIG. 11 presents an extremely large expansion of about 200%, there is a fear that the cushion rubber members 07 bonded to the carcass ply 02 may peel off or elongation of the cushion rubber members 07 may not be effected uniformly and unevenness in thickness may arise.

In addition, when thick members such as the cushion rubber members 07 are bonded to the carcass ply 02 at laterally symmetric positions and made to expand jointly with the carcass ply, there is a problem that due to different expansion rates between the left side and the right side caused by unevenness in thickness of the cushion rubber members 07, the base green case may expand in a distorted shape. So there is a disadvantage that deviation may arise also in the sticking position of the BT-band.

Furthermore, since the steps of folding the side walls 03, bonding, transferring the base green case from the first drum 010 to the second drum assembly 011 and expanding the same must be effected sequentially, high productivity cannot be expected.

SUMMARY OF THE INVENTION

The present invention has been worked out in view of the aforementioned points, and one object of the invention is to provide a method for efficiently manufacturing tires having stable quality, in which bonding positions of cushion rubber members can be set with high precision.

To that end, a method for manufacturing tires according to the present invention comprises the steps of presetting cushion rubber members preliminarily severed into a plurality of pieces at least at both side portions of a belt and at predetermined portions on a carcass ply, folding back the both side portions of the aforementioned carcass ply wrapped around a forming drum as well as side treads respectively superposed on the above-mentioned both side portions to simultaneously shape these into a predetermined shape on the aforementioned forming drum, and sticking a BT-band consisting of the above-mentioned belt and top tread preset integrally to a predetermined position.

Since a cushion rubber member is preset at predetermined positions of the belt and the carcass ply, precision of bonded positions of the cushion rubber member is improved, and tires having stable quality can be manufactured.

If a carcass ply, side treads and the like are set on a forming drum and a BT-band is set on the outer circumference of these members, then shaping, folding-back of side treads and sticking of a BT-band can be achieved almost simultaneously, and so, productivity of the manufacturing method is remarkably improved.

DETAILED DESCRIPTION OF THE PREFERRED EMBODIMENT

In the following, a description will be made on one preferred embodiment of the present invention illustrated in FIGS. 1 to 6.

In the method for manufacturing tires according to the illustrated embodiment, a assembly of constituent elements is effected nearly simultaneously by means of a single forming drum.

Figure 2:
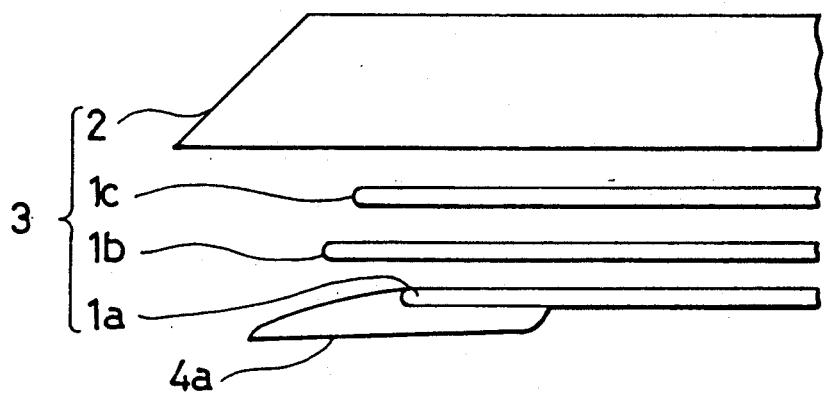
FIG. 2 is a partial cross-section view of a BT-band.

Preliminarily, in a preceding step, a belt 1 and a top tread 2 are joined together by means of a BT-drum to form a BT-band 3. At this time, among first to third belt layers 1a, 1b, and 1c forming three superposed layers, to the innermost first belt layer 1a are bonded portions 4a occupying 60% or more of the volume of a cushion rubber member 4 to be eventually embedded in tire shoulder portions, to establish a preset state. These cushion rubber member pieces 4a are bonded to the opposite side edge portions of the first belt layer 1a as projected outwards as shown in FIG. 2.

At predetermined positions symmetric in the lateral direction on an outer circumferential surface of a carcass ply 5 formed in a cylindrical shape and lined with an inner liner, are preliminarily bonded thin endless-belt-shaped cushion rubber member pieces 4b. The thickness of these cushion rubber member pieces 4b must be at least 0.5 mm for maintaining bonding between side walls 6 and the carcass ply 5. The should be about 5 mm at maximum for the purpose of not involving problem in a bonding work.

At the outer side edges of the left and right cylindrical side treads 6 formed in the preceding step, are also preset remaining pieces 4c of the cushion rubber member 4.

In this manner, the cushion rubber member 4 is severed into three pieces in the preceding step, the piece 4a occupying 60% or more of the cushion rubber member 4 held preset in the first belt layer 1a, another piece 4b held preset in the carcass ply, and the remaining piece 4c held preset in the side tread.

Figure 1:
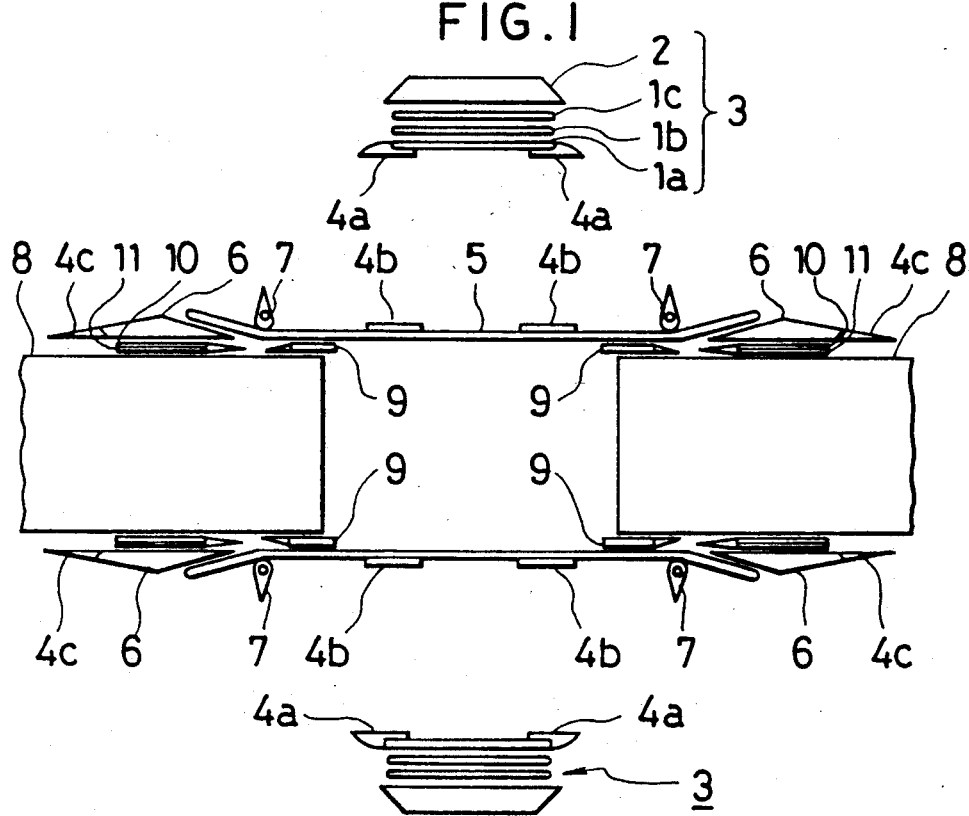
FIG. 1 is a cross-section view showing the state where the respective constituent elements of a tire have been set on a forming drum in a method for manufacturing tires according to one preferred embodiment of the present invention.

The above-described members and beads 7 are set on a forming drum 8 as shown in FIG. 1. On the forming drum 8 are disposed three kinds of bladders 9, 10 and 11 at laterally symmetric positions, placing the beads 7 at boundary positions with the bladder 9 is positioned on the inside and on the outside are positioned bladders 10 and 11, overlapped vertically.

First, side walls 6 are set along the outer circumferences of the right and left bladders 10 and 11, and a carcass ply 5 is fitted to the central portion. At this time the opposite ends of the carcass ply 5 overlap with parts of the side walls 6. The beads 7 are fitted in the proximities of the overlapping parts.

The BT-band 3 consisting of the belt 1 and the top tread 2 is set at the central position, and preparation for assembly is completed (See FIG. 1).

Figure 3:
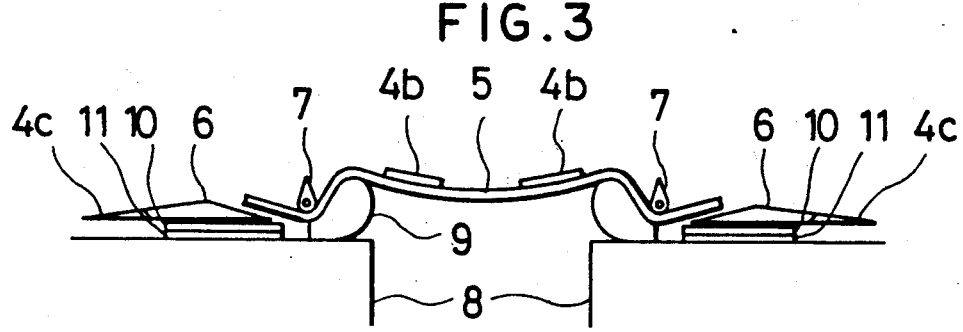
FIGS. 3 to 5 are cross-section views showing the successive steps in a process of manufacturing a green tire.
Figure 4:
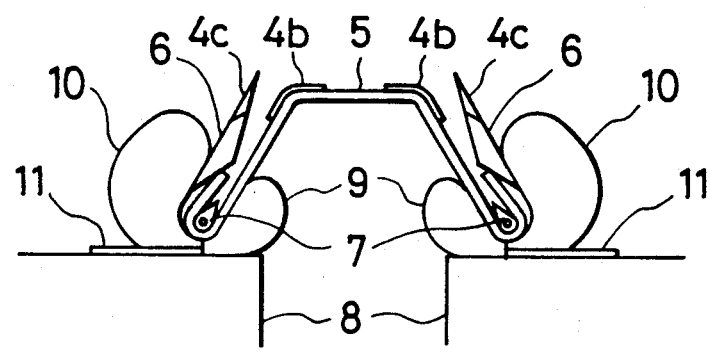
Figure 5:
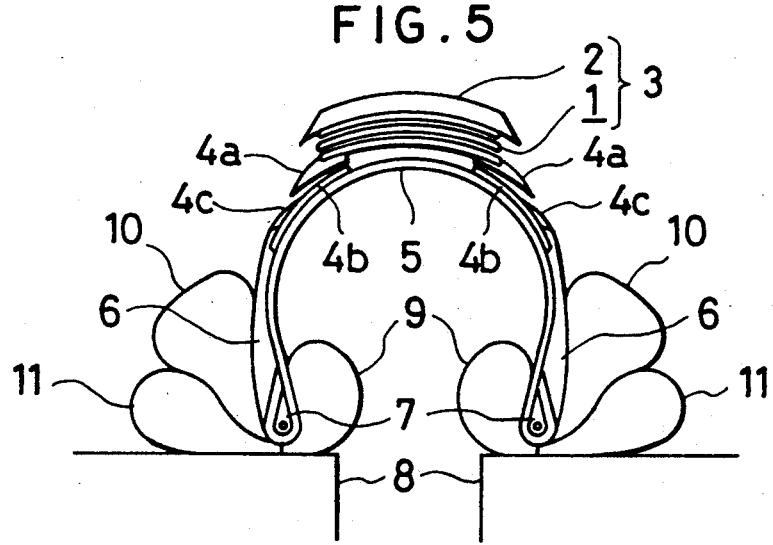

In the following description, the forming process will be explained sequentially with reference to FIGS. 3 to 5.

The left and right cylindrical portions of the forming drum 8 are made to approach each other, and at the same time, air is fed under pressure into the inside of the bladders 9. Since the opposite end portions of the carcass ply 5 are kept in tight contact with the left and right cylindrical portions of the forming drum 8 via the bladders 9, as a result of swelling of the bladders 9, the carcass ply section on the inside of the beads 7 will stand up as shown in FIG. 3.

Subsequently, when air is fed under pressure into the space inside of the carcass ply 5, the left and right cylindrical portions of the forming drum 8 further approach each other and the bladders 9 are further swelled, the central portion of the carcass ply 5 will expand outwards. If air is fed under pressure into the bladders 10 to be swelled simultaneously as in the above operation, then the carcass ply portion on the outside of the beads 7 and the side walls 6 will be folded back about the fulcrums consisting of the beads 7 (See FIG. 4).

When the above-described shaping proceeds further, the carcass ply 5 will have the width between the beads 7 narrowed, the expansion proceeds, resulting in formation of a toroidal shape, and the folded-back portions of the carcass ply 5 and the side walls 6 will come into contact with the inside portion of the carcass ply 5. Then, if the bladders 11 are swelled at an appropriate time, as the bladders 11 protrude so as to push away the bladders 10, the bladders 10 are pushed from below and increase the force of pressing the side walls 6 inwards. The carcass ply 5 and the side tread 6 are pinched under pressure and bonded together between the bladder 10 and the inside bladder 9 (See FIG. 5).

At the shoulder portion of the carcass ply 5 expanded in a toroidal shape, is positioned the cushion rubber member piece 4b as pulled and elongated, but since it is an originally thin cushion rubber member, it elongates nearly uniformly, and so it would not deform the toroidal shape of the carcass ply 5. To such cushion rubber member piece 4b is bonded the cushion rubber member piece 4c at the end portion of the folded-back side tread 6 and they become integral.

To the crown portion of the carcass ply 5 expanded in a toroidal shape is stuck the BT-band 3. At this time, the cushion rubber member pieces 4a stuck to the opposite side edges of the first belt layer 1a are bonded with the cushion rubber member pieces 4b on the side of the carcass ply 5, and they become integral.

In this way, the three-severed cushion rubber member pieces 4a, 4b and 4c are integrally joined at the tire shoulder portions.

The cushion rubber 4 used in this preferred embodiment has a composition such that a weight ratio of natural rubber or IR to SBR or BR is 100/0–70/30, content of carbon black is 20–50 weight %, and content of sulfur is 2–5 weight %, and has the characteristics of an exothermic property of $\tan \delta = 0.07$–$0.15$ (at a room temperature of 20° C.), a modulus of elasticity of 60–150 kg/cm$^2$ (300% Mod.), an antiruputre property (tensile strength at a breaking elongation) of 200 Kg/cm$^2$ and the like.

Figure 6:
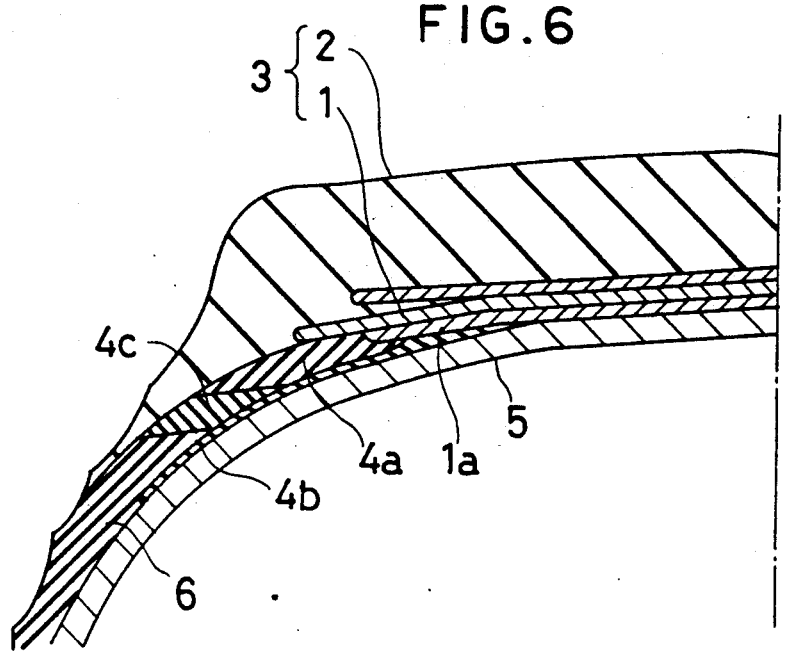
FIG. 6 is a cross-section view of an essential part of a tire manufactured through the same method.
Figure 7:
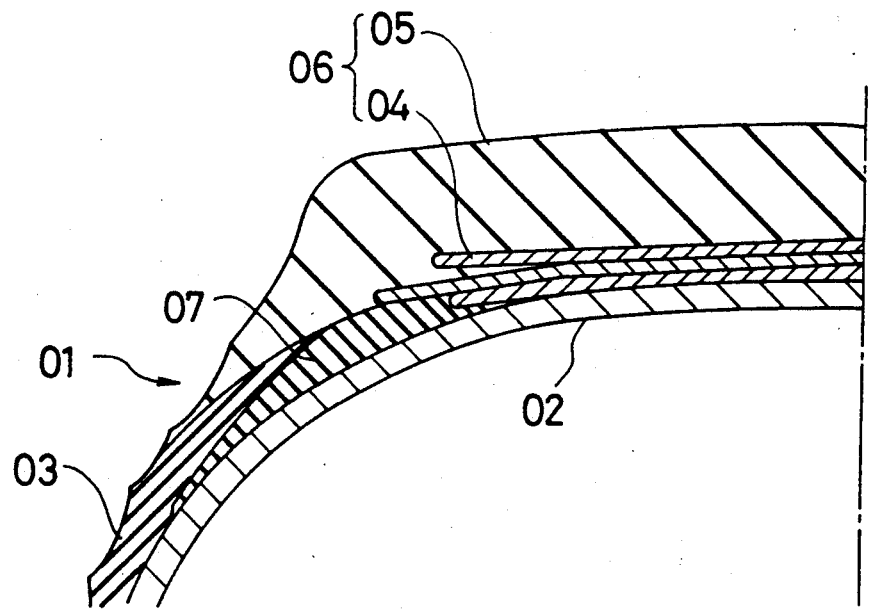
FIG. 7 is a cross-section view of an essential part of a tire manufactured through a known method in the prior art.
Figure 8:
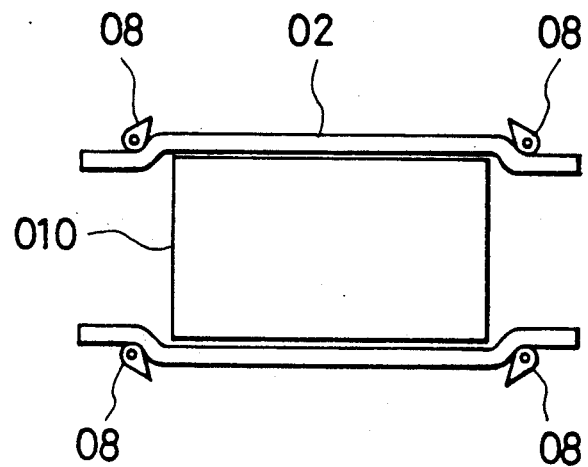
FIGS. 8 to 11 are cross-section views showing the successive steps in a process of manufacturing a green tire according to the known method in the prior art.
Figure 9:
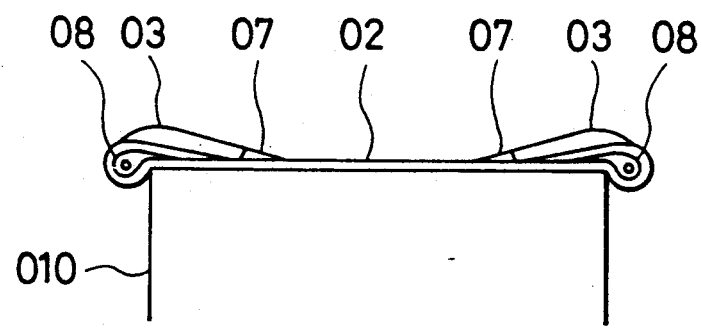
Figure 10:
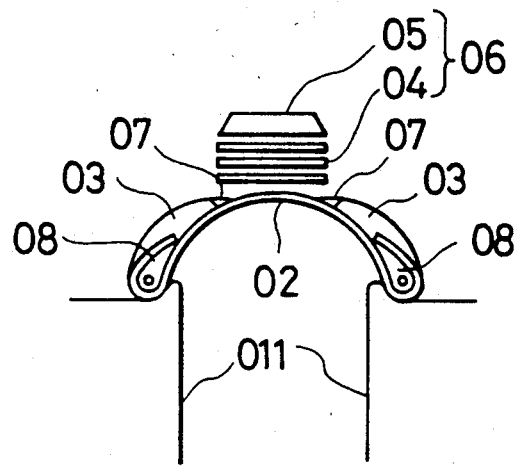
Figure 11:
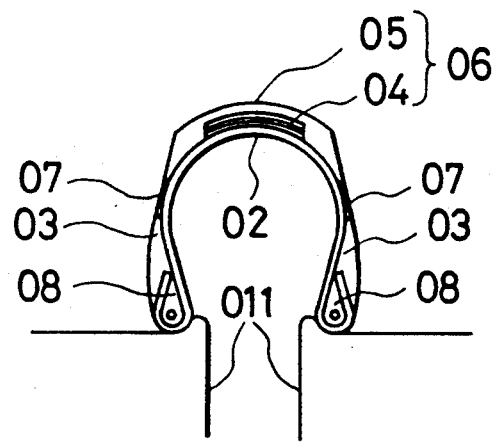

The state where the cushion rubber member pieces 4a, 4b and 4c joined together in the above-described manner are embedded in a tire shoulder portion is illustrated in FIG. 6.

A cushion rubber member pieces 4a positioned at each opposite end of the first belt layer 1a of the BT-band 3 and occupying a most part of the cushion rubber member 4 is bonded to the cushion rubber member pieces 4b on the side of the carcass ply 5 elongated jointly with the carcass ply 5, when the BT-band 3 is stuck to a crown portion of an expanded carcass ply 5. Accordingly the cushion rubber member pieces 4a are embedded with predetermined position in the tire at a high precision.

The cushion rubber member piece 4b on the side of the carcass ply 5 is useful for bonding and holding the folded-back side wall 6 and the carcass ply 5. Also, it supplements a gap of the cushion rubber member piece 4a on the side of the BT-band. As described previously, the cushion rubber member pieces 4b on the side of the carcass ply 5 cannot be preset in a large amount, because if it is preset too thick, there is a fear that the carcass ply 5 may be distorted upon expansion. Therefore, provision is made such that a deficient amount with only the cushion rubber pieces 4a and 4b may be supplemented by the cushion rubber member pieces 4c preset on the side walls 6. Accordingly, in the case where gap is not present, the presetting of cushion rubber member pieces 4c on the side treads 6 is unnecessary.

It is to be noted that while it may be conceived that the cushion rubber member pieces 4a are preset in a large amount on the side of the BT-band 3 so that this deficiency may not arise, as there is a limit in the thickness of the cushion rubber pieces 4a, in order to preset them in large amount it is necessary to provide the cushion rubber pieces 4a broadly in width as extended to both the left and right sides. Then, upon folding back the side treads 6 there is a problem that the folded-back end portions may be caught on the widely extended cushion rubber member pieces 4a. Moreover, if the extended portions of the cushion rubber member pieces 4a should project from the side portions of the top tread, the projected portions would be exposed on the outer surface of the tire. Such a tire is extremely poor in an anticutting property.

For the above-mentioned reasons, it is not preferable to the cushion rubber in a large amount exceeding a certain limit on the side of the BT-band. Therefore, it is necessary that cushion rubber member is severed, a major part of the member is preset on the side of the BT-band within a limit not causing the above-described inconvenience. Thereby any occurrence of the inconvenience is prevented, and precision in the bonding positions of cushion rubbers is maintained. Accordingly, tires having stable quality can be manufactured.

Owing to the fact that in the preceding step, severed cushion rubber member pieces are preset, and after the respective constituent elements have been set on a forming drum, simultaneously with shaping, folding-back and sticking of side treads and the like are effected nearly in simultaneous processing, production efficiency is high.

What is claimed is:

1. A method for assembling constituent elements of a tire having a carcass ply, side walls, a plurality of belts, a top tread and segmented rubber components all of the same material for cushion rubber members embedded in tire shoulder portions to provide resiliency between said belts and said carcass ply, comprising the steps of; presetting a portion comprising at least 60% by volume but not all of said segmented rubber components for said cushion rubber members at both side portions of a radially innermost belt of said belts; presetting said belts and said top tread to form a BT-band; presetting at least a portion of the remaining segmented rubber components of said cushion rubber members at predetermined positions on said carcass ply; wrapping said side walls around both side portions of a forming drum; wrapping said carcass ply around a central portion of said forming drum with the both side portions of the carcass ply overlapped on portions of said side walls; shaping said carcass ply into a generally toroidal shape by folding back said side walls and said side portions of said carcass ply to press said side walls against said carcass ply; and sticking said BT-band to a predetermined position on the shaped carcass ply, whereby said segmented rubber components preset at said radially innermost belt and said carcass ply are joined together to form said cushion rubber members without distortion of said carcass ply during shaping.

2. A method as claimed in claim 1, wherein a portion of the segmented rubber components are preset also on the side wall.

3. A method as claimed in claim 1, wherein the thickness of the segmented rubber member components preset on the carcass ply are in the range of 0.5 mm to 5 mm.

* * * * *